June 3, 1941.   L. G. BRIGGS   2,243,942
HEARING AID BATTERY
Filed Dec. 21, 1939
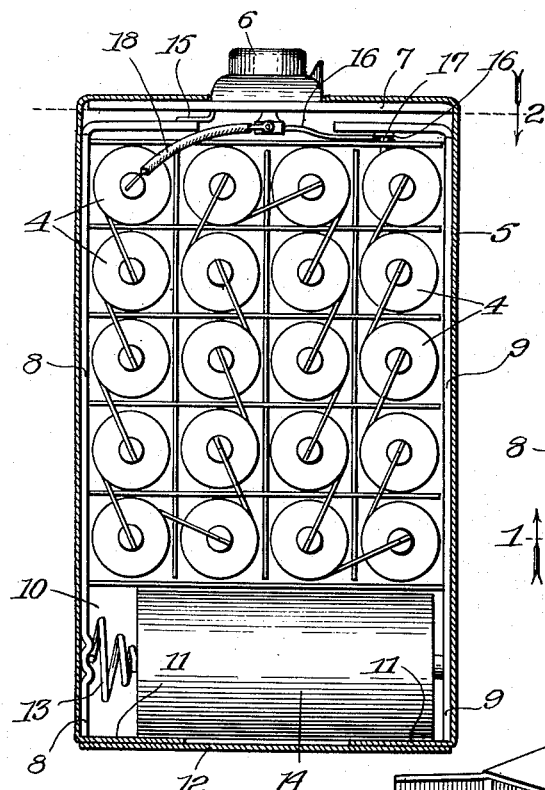
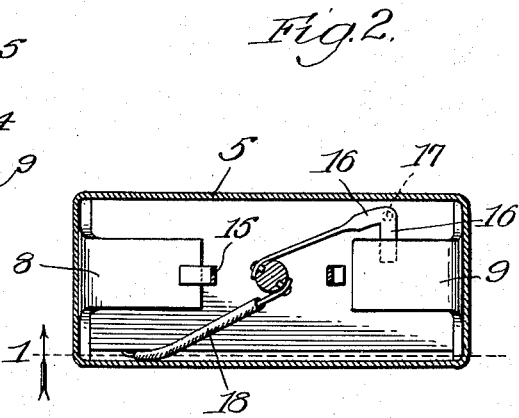
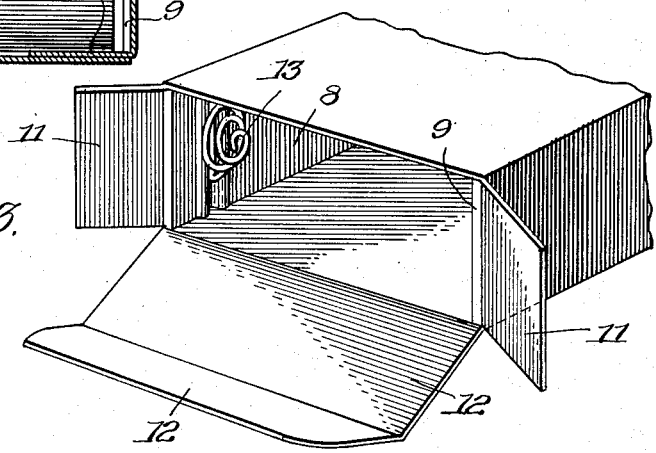
Inventor:
Leland G. Briggs,
By Chritton, Wiles, Davies, Hirsch & Dawson,
Attys.

Patented June 3, 1941

2,243,942

UNITED STATES PATENT OFFICE 2,243,942

HEARING AID BATTERY

Leland G. Briggs, Madison, Wis., assignor to Ray-O-Vac Company, a corporation of Wisconsin Application December 21, 1939, Serial No. 310,461

4 Claims. (Cl. 136—109)

This invention relates to electric battery assemblies, and more particularly to an improved casing adapted to conveniently hold and protect dry cells.

The primary object of the invention is to provide a light and inexpensive battery, containing an A battery and a B battery, such as is commonly used and must be carried around with hearing-aid devices.

One of the principal difficulties with hearing-aid devices which require both A and B batteries is in the weight of the battery assembly. Ordinarily, the A battery has a shorter life than the B battery in the assembly and it is customary to replace the single cell of the A battery several times before the B battery must be discarded. In view of the fact that the entire battery must be replaced from time to time, it is desirable to have a relatively inexpensive casing which will be strong enough to stand the abuse of being carried around and handled. One of the principal objects of the present invention is to utilize the metallic conductors in the casing to reinforce the side walls of the relatively weak structure and thereby protect all of the cells against damage or breakage in the course of rough handling.

A further object of the invention is to provide good firm contacts for the removable dry cell, as it is important that the resistance in the circuit of a hearing-aid device be held as constant as possible.

Another object of the invention is to provide a battery assembly which is attractive in appearance, will protect the cells from dirt, and enable the cell to be removed readily. It is also desirable to have the A cell fully enclosed, as occasionally a defective cell will leak and its chemicals are apt to damage the clothing of the person carrying the device in his pocket.

The invention is illustrated in a preferred embodiment in the accompanying drawing, in which:

Figure 1 is a vertical sectional view, taken as indicated at line 1 of Figure 2, showing the battery assembly; Figure 2 is a transverse sectional view, taken as indicated at line 2 of Figure 1; and Figure 3 is a broken perspective view of the end of the casing with the tuck-in flap shown in opened position.

In the embodiment illustrated, a plurality of small dry cells 4 are connected up and nested in a unit to form a B battery. The B battery is fixed in a fabric carton 5 which is provided at its upper end with a contact member 6 in the form of a socket which is not part of the present invention but is adapted to make three separate electrical contacts with a suitable plug member. The contact is mounted on a panel 7 of insulating material and the leads from the various parts of the battery are through this plate.

A pair of wide resilient metallic reinforcing strips 8 and 9, preferably of brass, is provided adjacent to the inner walls of the carton and extend to practically the full length thereof. The strips are of substantially the same width as the side walls of the carton and form an excellent protective reinforcement. A compartment 10, large enough to receive a dry cell, is afforded in one end of the carton, adjacent to the B battery. This compartment is normally closed by flaps 11 and a foldable tuck-in closure member 12. The lower end of the reinforcing strip 8 is provided with a spiral spring 13 which is adapted to engage the bottom of a dry cell 14. The upper end of the strip 8 is connected to the contact member, as indicated at 15. The other terminal of the dry cell makes contact with the resilient strip 9 and is connected to one of the terminals of the contact member 6, by suitable lead as indicated at 16. This same contact may be connected with the negative side of the B battery, as indicated at 17. The B battery also is connected with the contact member 6 by conductor 18.

The carton, described above, is light in weight and the wide brass contact strips protect the B battery block as well as reinforce the outer carton. As the strips are made of spring brass, they hold their shape, and even though dropped on the floor or subjected to other strains the efficiency of the unit is not likely to be impaired. The resilient brass strips on the spiral spring 13 insure good tight contacts for the A cell, and it is locked securely in position by the tuck-in flap 12. When it is desired to replace the removable cell, it is merely necessary to pull out the flap, reach in and extract the exhausted cell with the fingers and place a new cell in position. The device is practically fool-proof because the spiral spring contact is best adapted to engage the bottom of the dry cell which is the negative contact. The clearance between the ends of the cell and the brass strips makes it easy to grip and withdraw the cell.

The foregoing detailed description has been given for clearness of understanding only, and no unnecessary limitations should be understood therefrom, for some modifications will be obvious to those skilled in the art.

I claim:

1. A battery assembly comprising: a box-like casing provided with a multiple contact member and having at one end a tuck-in foldable flap forming a closure for the casing; a multiple cell battery fixed in said casing and having electrical connections with said contact member; a cell removably mounted in said end of the casing so as to be concealed by said closure; and a pair of metallic strips connecting said cell with the contact member, said strips being of substantially the same width as a pair of opposed side walls of the casing and disposed adjacent thereto so as to reinforce the casing structurally.

2. A device as specified in claim 1, in which the casing is made of a yieldable fabric and the metallic strips are made of thin resilient brass and extend to the full length of the multiple cell battery so as to guard al lof the cells against breakage.

3. A battery assembly comprising: a box-like fabric casing in which is permanently fixed a multiple cell battery so as to provide a small compartment in one end to receive a single removable cell; a tuck-in foldable flap adapted to form a closure for the compartment; and a pair of wide, resilient metal reinforcing strips for a pair of opposed side walls of said casing extending substantially throughout the length and width thereof and serving as electrical conductors for a single cell placed in said compartment.

4. A device as specified in claim 3, in which a coil contact spring is secured to one of the strips for holding a cell between said reinforcing strips.

LELAND G. BRIGGS.